(12) United States Patent
Wang et al.

(10) Patent No.: US 11,975,714 B2
(45) Date of Patent: May 7, 2024

(54) INTELLIGENT VEHICLES WITH DISTRIBUTED SENSOR ARCHITECTURES AND EMBEDDED PROCESSING WITH COMPUTATION AND DATA SHARING

(71) Applicant: GM GLOBAL TECHNOLOGY OPERATIONS LLC, Detroit, MI (US)

(72) Inventors: Shige Wang, Northville, MI (US); Wei Tong, Troy, MI (US); Stephen N. McKinnie, Livonia, MI (US); Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1223 days.

(21) Appl. No.: 16/671,727

(22) Filed: Nov. 1, 2019

(65) Prior Publication Data

US 2021/0129842 A1  May 6, 2021

(51) Int. Cl.
*B60W 30/14* (2006.01)
*B60W 30/09* (2012.01)
*B60W 30/17* (2020.01)
*H04J 3/06* (2006.01)
*H04L 12/40* (2006.01)
(Continued)

(52) U.S. Cl.
CPC .......... *B60W 30/146* (2013.01); *B60W 30/09* (2013.01); *B60W 30/17* (2013.01); *H04J 3/0644* (2013.01); *H04J 3/0664* (2013.01); *H04L 12/403* (2013.01); *H04L 67/12* (2013.01);
(Continued)

(58) Field of Classification Search
CPC .... B60W 30/146; B60W 30/09; B60W 30/17; B60W 50/00; B60W 2050/0043; H04J 3/0644; H04J 3/0664; H04L 12/403; H04L 67/12; H04L 2012/40215; H04L 2012/40273; H04Q 9/00; H04W 4/38; H04W 4/48; G05D 1/0236; G05D 1/0221; G05D 1/024; G05D 1/0242; G05D 1/0253; G05D 1/0255; G05D 1/0257;
(Continued)

(56) References Cited

U.S. PATENT DOCUMENTS 8,504,864 B2 * 8/2013 Menon .................. H04L 12/403
713/400
9,378,072 B2 6/2016 Wang et al.
(Continued)

*Primary Examiner* — Maceeh Anwari
(74) *Attorney, Agent, or Firm* — Quinn IP Law

(57) ABSTRACT

Presented are embedded control systems with logic for computation and data sharing, methods for making/using such systems, and vehicles with distributed sensors and embedded processing hardware for provisioning automated driving functionality. A method for operating embedded controllers connected with distributed sensors includes receiving a first data stream from a first sensor via a first embedded controller, and storing the first data stream with a first timestamp and data lifespan via a shared data buffer in a memory device. A second data stream is received from a second sensor via a second embedded controller. A timing impact of the second data stream is calculated based on the corresponding timestamp and data lifespan. Upon determining that the timing impact does not violate a timing constraint, the first data stream is purged from memory and the second data stream is stored with a second timestamp and data lifespan in the memory device.

20 Claims, 4 Drawing Sheets

(51) Int. Cl.
*H04L 12/403* (2006.01)
*H04L 67/12* (2022.01)

(52) U.S. Cl.
CPC ............... *H04L 2012/40215* (2013.01); *H04L 2012/40273* (2013.01)

(58) Field of Classification Search
CPC .. G05D 1/0259; G05D 1/0276; G05D 1/0278; G05D 1/0291; G05D 2201/0201
USPC .......................................................... 701/93
See application file for complete search history.

(56) References Cited

U.S. PATENT DOCUMENTS

| | | |
|---|---|---|
| 9,720,742 B2 | 8/2017 | Wang et al. |
| 9,740,178 B2 | 8/2017 | Debouk et al. |
| 2018/0295011 A1 | 10/2018 | Wang et al. |

\* cited by examiner

INTELLIGENT VEHICLES WITH DISTRIBUTED SENSOR ARCHITECTURES AND EMBEDDED PROCESSING WITH COMPUTATION AND DATA SHARING

INTRODUCTION

The present disclosure relates generally to embedded control systems. More specifically, aspects of this disclosure relate to intelligent motor vehicles with distributed vision sensor architectures and embedded processing hardware for provisioning automated driving functionality.

Current production motor vehicles, such as the modern-day automobile, are originally equipped with or retrofit to include a network of onboard electronic devices that provide automated driving capabilities that help to minimize driver effort. In automotive applications, for example, the most recognizable type of automated driving feature is the cruise control system. Cruise control allows a vehicle operator to set a particular vehicle speed and have the onboard vehicle computer system maintain that speed without the driver operating the accelerator or brake pedals. Next-generation Adaptive Cruise Control (ACC) is an automated driving feature that regulates vehicle speed while concomitantly managing fore and aft spacing between the host vehicle and leading/trailing vehicles. Another type of automated driving feature is the Collision Avoidance System (CAS), which detects imminent collision conditions and provides a warning to the driver while also taking preventative action autonomously, e.g., by steering or braking without driver input. Intelligent Parking Assist Systems (IPAS), Lane Monitoring and Automated Steering ("Auto Steer") Systems, and other Advanced Driver Assistance Systems (ADAS), along with autonomous driving capabilities, are also available on many modern-day automobiles.

As vehicle processing, communication, and sensing capabilities continue to improve, manufacturers will persist in offering more system-automated driving capabilities with the aspiration of eventually producing fully autonomous vehicles competent to operate among heterogeneous vehicle types in both urban and rural scenarios. Original equipment manufacturers (OEM) are moving towards vehicle-to-vehicle (V2V) and vehicle-to-infrastructure (V2I) "talking" cars with higher-level driving automation that employ autonomous control systems to enable vehicle routing with steering, lane changing, scenario planning, etc. Automated route generation systems utilize vehicle tracking and dynamics sensors, map and road condition data, and path prediction algorithms to provide path derivation with automated lane center and lane change forecasting. Computer-assisted rerouting techniques automate constructing alternative travel routes that may be updated based on real-time and virtual vehicle data.

Many automobiles are now equipped with onboard vehicle navigation systems that utilize a global positioning system (GPS) transceiver in cooperation with navigation software and geolocation mapping services to obtain roadway topography, traffic, and speed limit information associated with the vehicle's current location. Autonomous driving and advanced driver assistance systems are often able to adapt certain automated driving maneuvers based on roadway information obtained by the in-vehicle navigation system. Ad-hoc-network-based ADAS, for example, may employ GPS and mapping data in conjunction with multi-hop geocast V2V and V2I data exchanges to facilitate automated vehicle maneuvering and powertrain control. During assisted and unassisted vehicle operation, the resident navigation system may identify a recommended travel route based on an estimated shortest travel time or estimated shortest travel distance between route origin and route destination for a given trip. This recommended travel route may then be displayed as a map trace or as turn-by-turn driving instructions on a geocoded and annotated map with optional voice commands output by the in-vehicle audio system.

Automated vehicle systems and subsystems employ an assortment of embedded sensing devices and electronic control units (ECUs) to generate and process sensor data for regulating in-vehicle actuators. Many resident vehicle systems operate independent of one another and, thus, do not communicate or exchange data. For instance, automated Vehicle Detection (VD), Pedestrian Detection (PD), and Lane Detection (LD) subsystems conventionally employ independent, dedicated ECUs that communicate asynchronously over a controller-area network (CAN) with discrete sensing devices operating at distinct rates. Despite using separate ECUs and sensors, these automated subsystems oftentimes rely on many of the same sensor inputs and vehicle data—sometimes referred to as "global variables"-to enable their respective functionalities. Independently operating multiple ECUs and sensor arrays to produce and process the same data is inherently inefficient, resulting in superfluous component and function redundancies, amplified computational complexity and burden, and increased system hardware and software costs.

SUMMARY

Presented herein are embedded control systems with attendant logic for optimized processing through computation and data sharing, methods for making and methods for using such systems, computer-readable media for provisioning such logic, and motor vehicles with distributed sensor architectures and embedded processing hardware for provisioning automated driving functionality. By way of example, there are presented systems, methods, and architectures for high-performance embedded vision processing through function and data sharing. The system architecture includes a distributed array of discrete sensing devices communicating with multiple independently operable controllers, which are designed to avoid duplicated data computation and repeat loading of common functions through a shared data buffer and a shared computation module. The shared buffer stores incoming sensor data within a pre-defined lifespan and precludes redundant computation of the same data. Synchronized computation sharing is achieved through merging operated data and/or reordering of the computation requests from different applications. These protocols improve overall device utilization and system performance, especially for architectures in which multiple sensor processing functions share a common set of hardware devices, such as a graphical processing unit (GPU), field-programmable gate array (FPGA), application specific integrated circuit (ASIC), etc.

Aspects of this disclosure are directed to control algorithms and processing logic for making or for using any of the disclosed intelligent motor vehicles and/or embedded processing systems. In an example, a method is presented for operating a networked set of embedded controllers that is operatively connected with a distributed array of sensors. This representative method includes, in any order and in any combination with any of the above and below disclosed options and features: receiving a first data stream from a set of sensors via a first embedded controller; storing the first data stream with a respective timestamp and data lifespan via a shared data buffer in a resident memory device; receiving a second data stream from the set of sensors via a second embedded controller; determining a timing impact of the stored first data input stream based on the received second data input stream; determining if this timing impact violates a predefined timing constraint; and, responsive to the timing impact violating the timing constraint, purging the first data stream from the resident memory device and storing the second data stream with a respective timestamp and data lifespan in the memory device. Responsive to the timing impact not violating the timing constraint, skipping the second sensor data reading of the set of sensors.

Additional aspects of this disclosure are directed to motor vehicles with distributed sensor architectures and embedded processing hardware for provisioning automated driving functionality. As used herein, the terms "vehicle" and "motor vehicle" may be used interchangeably and synonymously to include any relevant vehicle platform, such as passenger vehicles (e.g., internal combustion, hybrid electric, full electric, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle is presented that includes a vehicle body with multiple road wheels and other standard original equipment. Also mounted to the vehicle body is a powertrain system with a prime mover, such as a traction motor and/or an internal combustion engine, that is selectively connected to a power transmission to drive one or more of the road wheels to thereby propel the vehicle. The vehicle is also equipped with a steering system operable to turn one or more of the road wheels to thereby govern a heading of the vehicle, and a brake system operable to reduce a rotational speed of the road wheels to thereby slow and/or stop the vehicle.

Continuing with the discussion of the above example, the motor vehicle also includes a vehicle controller, which may be embodied as a resident or remote electronic control unit or one or more of the controllers in a network of distributed controllers that regulate operation of one or more resident vehicle systems and/or subsystems. This vehicle controller is programmed to read a first data input stream received from the sensors via a first embedded controller, and store the first data input stream with a first timestamp and a first data lifespan via a shared data buffer in a resident memory device. The vehicle controller also reads a second data input stream received from the sensors via a second embedded controller, and calculates a timing impact of the first data input stream, e.g., based on the second data stream. Upon determining that the timing impact violates a predefined timing constraint, the controller responsively: purges the first data input stream from the resident memory device, and stores the second data input stream with a second timestamp and a second data lifespan in the resident memory device. The vehicle controller then transmits one or more command signals to the vehicle's steering system, brake system, and/or powertrain system to execute one or more control operations based on the data input stream stored in the resident memory device.

Additional aspects of this disclosure are directed to memory-stored, processor-executable instructions for carrying out any of the disclosed methods, algorithms, and/or logic. By way of non-limiting example, a non-transitory, computer-readable medium stores a set of instructions for execution by at least one of one or more processors of an embedded network of electronic controllers. The networked controllers are connected via a communication interface with a distributed array of sensors. The memory-stored instructions cause the embedded electronic controllers to perform a variety of steps, which may include a first embedded controller receiving a first data input stream from a set of sensors, and temporarily storing the first data stream with a first timestamp and a first data lifespan via a shared data buffer in a non-transitory memory device. A second embedded controller receives a second data input stream from sensor set. Upon receipt of the second data stream, one of the embedded controllers or a networked master controller determines a timing impact of the first data input stream based on the second data input stream. If the timing impact violates a predefined timing constraint, a network controller responsively purges the first data input stream from the resident memory device, and concurrently stores the second data input stream with a second timestamp and a second data lifespan in the resident memory device. For an automotive application, one or more vehicle control modules may use the memory-stored data to execute one or more control operations for performing an automated vehicle driving maneuver.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
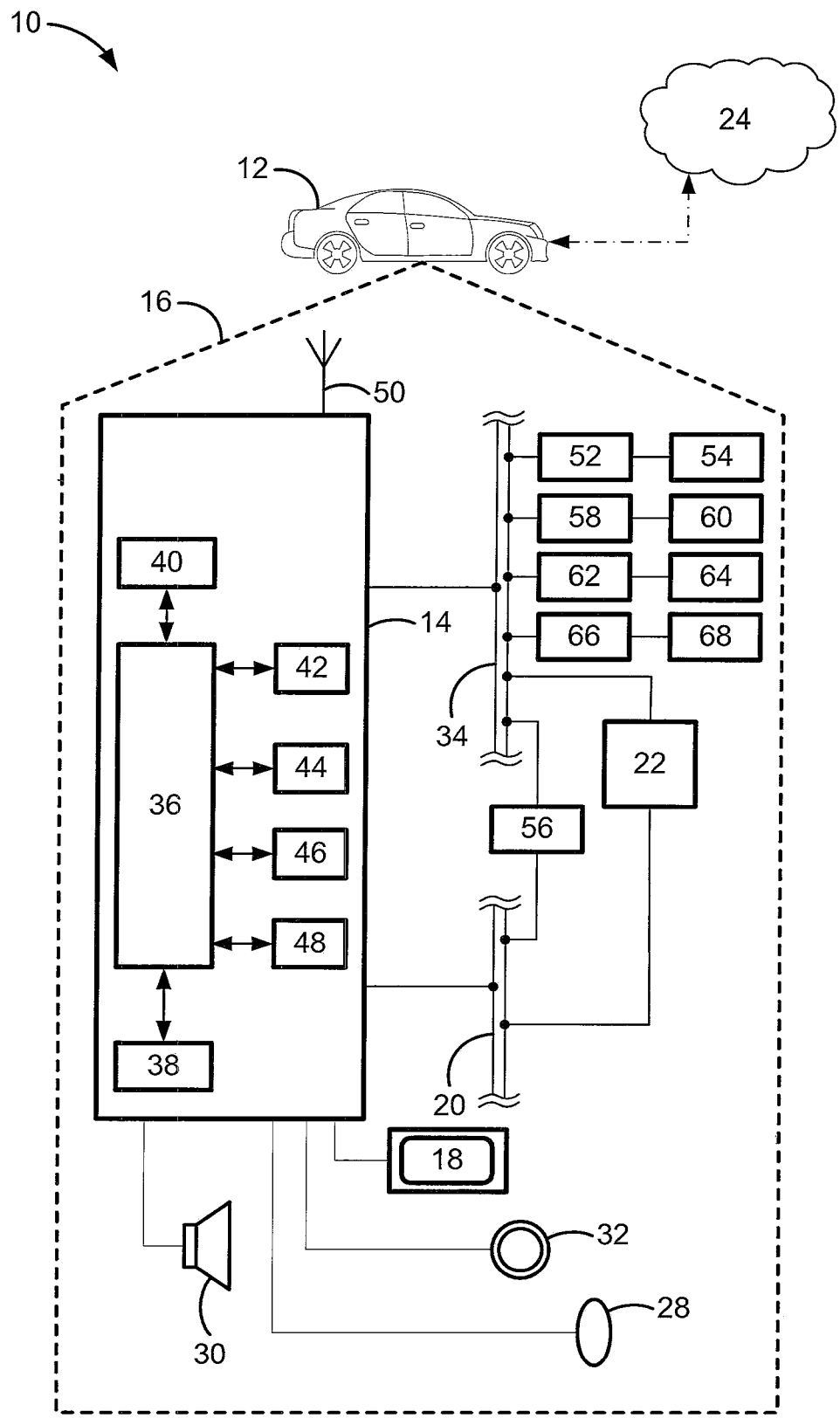
FIG. 1 is a partially schematic, side-view illustration of a representative motor vehicle with an embedded network of in-vehicle controllers, sensing devices, and communication devices for executing sensor data processing and automated driving operations in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style passenger vehicle. Packaged on a vehicle body 12 of the automobile 10, e.g., distributed throughout the different vehicle compartments, is an onboard network of electronic devices for executing one or more automated or autonomous driving operations. The illustrated automobile 10—also referred to herein as "motor vehicle" or "vehicle" for short—is merely an exemplary application with which aspects and features of this disclosure may be practiced. In the same vein, implementation of the present concepts for the specific embedded processing architectures and autonomous driving systems and operations discussed below should also be appreciated as exemplary applications of novel features disclosed herein. As such, it will be understood that aspects and features of this disclosure may be applied to different embedded processing architectures, utilized for other automated driving operations, and implemented for any logically relevant type of motor vehicle. Moreover, only select components of the embedded processing architectures and motor vehicles are shown and will be described in additional detail herein. Nevertheless, the vehicles and systems discussed herein may include numerous additional and alternative features, and other available peripheral components, for example, for carrying out the various methods and functions of this disclosure.

The representative vehicle 10 of FIG. 1 is originally equipped with a vehicle telecommunication and information ("telematics") unit 14 that wirelessly communicates (e.g., via cell towers, base stations, mobile switching centers, satellite service, etc.) with a remotely located or "off-board" cloud computing service system 24. Some of the other vehicle hardware components 16 shown generally in FIG. 1 include, as non-limiting examples, an electronic video display device 18, a microphone 28, one or more audio speakers 30, and assorted input controls 32 (e.g., buttons, knobs, switches, touchpads, keyboards, touchscreens, etc.). Generally, these hardware components 16 function, in part, as a human/machine interface (HMI) that enables a user to communicate with the telematics unit 14 and other systems and system components within the vehicle 10 and external to the vehicle 10. Microphone 28 provides a vehicle occupant with means to input verbal or other auditory commands; the vehicle 10 may be equipped with an embedded voice-processing unit utilizing audio filtering, editing, and analysis software modules. Conversely, speaker 30 provides audible output to a vehicle occupant and may be either a stand-alone speaker dedicated for use with the telematics unit 14 or may be part of audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, internal/external parallel/serial communication bus, a local area network (LAN) interface, a controller area network (CAN), a media-oriented system transfer (MOST), a local interconnection network (LIN) interface, and the like. Other appropriate communication interfaces may include those that conform with ISO, SAE, and IEEE standards and specifications. The network connection interface 34 enables the vehicle hardware 16 to send and receive signals with each other and with various systems and subsystems both within or "resident" to the vehicle body 12 and outside or "remote" from the vehicle body 12. This allows the vehicle 10 to perform various vehicle functions, such as controlling vehicle steering, governing operation of the vehicle's transmission, modulating engine throttle and/or motor output, engaging/disengaging the brake system, and other automated driving functions. For instance, telematics unit 14 receives and/or transmits data to/from an autonomous systems control module (ACM) 52, an engine control module (ECM) 54, a powertrain control module (PCM) 56, a sensor system interface module (SSIM) 58, a brake system control module (BSCM) 60, and assorted other vehicle ECUs, such as a transmission control module (TCM), a climate control module (CCM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to one or more electronic memory devices 38, each of which may take on the form of a CD-ROM, magnetic disk, IC device, semiconductor memory (e.g., various types of RAM or ROM), etc., and a real-time clock (RTC) 42. Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components, or may include additional components and functionality as desired for a particular end use. The various communication devices described above may be configured to exchange data as part of a periodic broadcast in a V2V communication system or a vehicle-to-everything (V2X) communication system, e.g., Vehicle-to-Infrastructure (V2I), Vehicle-to-Pedestrian (V2P), and/or Vehicle-to-Device (V2D).

CPU 36 receives sensor data from one or more sensing devices that use, for example, photo detection, radar, laser, ultrasonic, optical, infrared, or other suitable technology for executing an automated driving operation, including short range communications technologies such as DSRC or Ultra-Wide Band (UWB). In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

Digital camera 62 may use a charge coupled device (CCD) sensor or other suitable optical sensor to generate images indicating a field-of-view of the vehicle 10, and may be configured for continuous image generation, e.g., generating at least about 35 images per second. By way of comparison, range sensor 64 may emit and detect reflected radio, infrared, light-based or other electromagnetic signals (e.g., radar, EM inductive, Light Detection and Ranging (LIDAR), etc.) to detect the presence, geometric dimensions, and/or proximity of an object. Vehicle speed sensor 66 may take on various forms, including wheel speed sensors that measure wheel speeds, which are then used to determine real-time vehicle speed. In addition, the vehicle dynamics sensor 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameters. Using data from the sensing devices 62, 64, 66, 68, the CPU 36 identifies surrounding driving conditions, determines characteristics of road surface conditions, identifies objects within a detectable range of the vehicle 10, determines attributes of the target object, such as size, relative position, angle of approach, relative speed, etc., and executes automated control maneuvers based on these executed operations.

These sensors are distributed throughout the motor vehicle 10 in operatively unobstructed positions relative to views fore and aft or on port and starboard sides of the vehicle. Each sensor generates electrical signals indicative of a characteristic or condition of a targeted subject, generally as an estimate with a corresponding standard deviation. While the operating characteristics of these sensors are generally complementary, some are more reliable in estimating certain parameters than others. Most sensors have different operating ranges and areas of coverage, and are capable of detecting different parameters within their operating range. For instance, a radar-based sensor may estimate range, range rate, and azimuth location of an object, but may not be robust in estimating the extent of a detected object. Cameras with optics processing, on the other hand, may be more robust in estimating a shape and azimuth position of an object, but may be less efficient at estimating the range and range rate of the object. A scanning-type LIDAR-based sensor may perform efficiently and accurately with respect to estimating range and azimuth position, but may be unable to accurately estimate range rate and, thus, may not be accurate with respect to new object acquisition/recognition. Ultrasonic sensors, by comparison, are capable of estimating range but are generally unable to accurately estimate range rate and azimuth position. Further, the performance of many sensor technologies may be affected by differing environmental conditions. Consequently, sensors generally present parametric variances whose operative overlap offer opportunities for sensory fusion.

Figure 2:
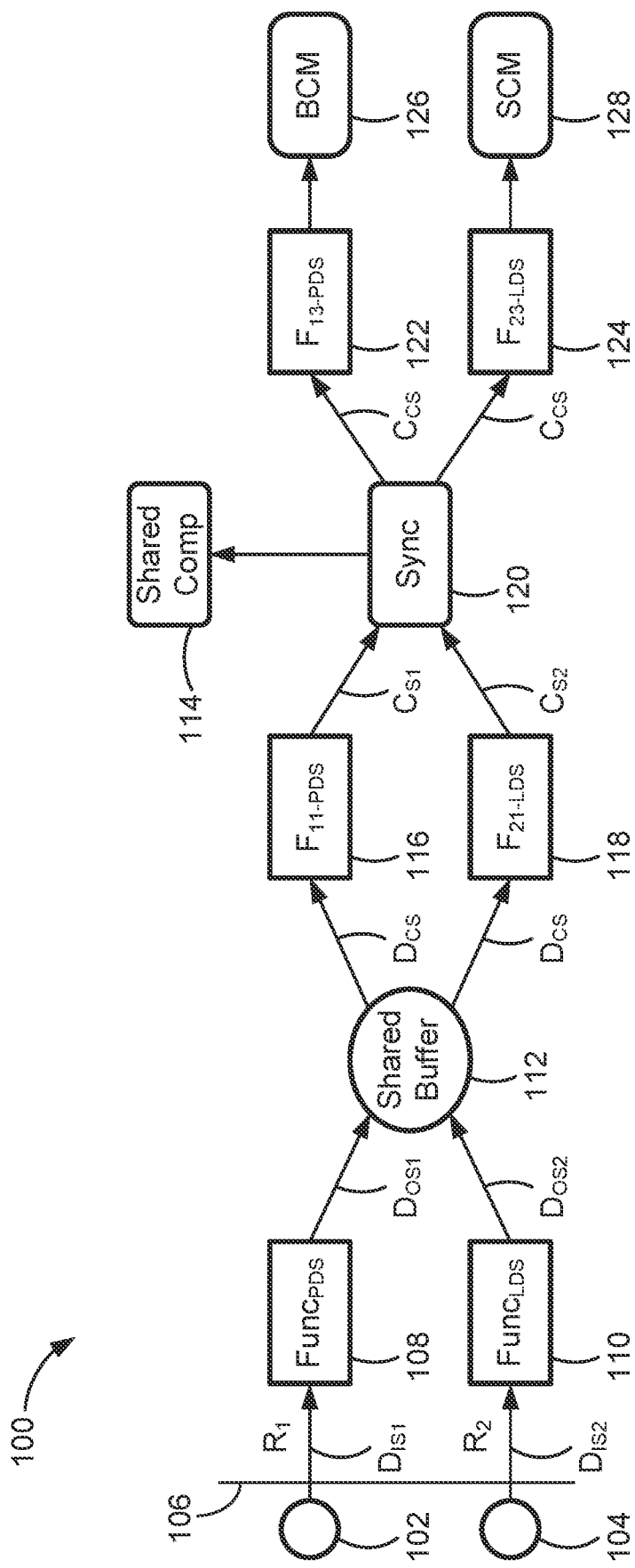
FIG. 2 is a diagrammatic illustration of a representative embedded control system with a distributed sensor array communicating with multiple independently operable controllers for carrying out embedded sensor data processing with function and data sharing in accordance with aspects of the present disclosure.

Illustrated in FIG. 2 is an embedded control system 100 with a distributed array of sensors, such as first and second optical sensors 102 and 104, respectively, that communicate via a controller area network (CAN) bus 106 with a network of discrete controllers, such as first and second electronic control units 108 and 110, respectively, to enable high-performance embedded processing through data and computation sharing. The first optical sensor 102 may be in the nature of a wide-angle, forward-facing digital video camera with a max distance of about 50-75 m, while the second optical sensor 104 may be in the nature of a narrow-angle, forward-facing digital video camera with a max distance of about 125-150 m. Embedded control system 100 enables data and computation sharing among discrete, embedded controllers to minimize or otherwise eliminate redundant computations and storage of duplicative data. Capable of being implemented in automotive and non-automotive applications alike, disclosed embedded processing techniques utilize data and computational sharing to consume reduced amounts of computing capacity and memory storage, thus yielding higher embedded computing performance.

As will be explained in further detail below, the system 100 is equipped with a shared data buffer 112 and a shared computation module 114 that provision data merging and function unification to share sensor data and computation amongst different automated and autonomous functions. Recognizing that multiple features may run on a single controller or multiple controllers, the embedded control system 100 apportions data and computation to leverage sharing of system hardware (HW) and software (SW). While shown with two sensors 102, 104 communicating with two ECUs 108, 110 across a single CAN bus 106, it will be appreciated that the embedded control system 100 may comprise any two or more sensing devices communicating with any two or more control devices across multiple communication interfaces within the scope of this disclosure. Furthermore, the system and features of FIG. 2 may be incorporated into the vehicle 10 of FIG. 1 and, thus, may take on any of the features, options, and alternatives described above with respect to the illustrated component architecture, and vice versa With continuing reference to FIG. 2, the first ECU 108, which may be embodied as a programmable Pedestrian Detection (PD) subsystem microcontroller, receives as input a first data stream $D_{IS1}$ at a first sampling rate $R_1$ from the first and second optical sensors 102 and 104. ECU 108 preprocesses the data input stream $D_{IS1}$, as part of a first preprocessing operation $Func_{PDS}$, and transmits a first data output stream $D_{OS1}$ to a read/write shared data buffer 112. Comparatively, the second ECU 110, which may be embodied as a programmable Lane Detection (LD) subsystem microcontroller, receives as input a second data stream $D_{IS2}$ at a second sampling rate $R_2$ from the first and second optical sensors 102, 104. ECU 110 then preprocesses the data input stream $D_{IS2}$, as part of a second preprocessing operation $Func_{LDS}$, and transmits a second data output stream $D_{OS2}$ to the shared data buffer 112. To minimize superfluous memory use for storing duplicative data, the shared data buffer 112 may store only one of the data output streams $D_{OS1}$, $D_{OS2}$, or select segments thereof, which may be analyzed and replaced at a future time when deemed necessary. For distinct sampling rates, the shared data buffer 112 may automatically deny or disable system measurements and/or computations that generate the data upon determining that the data's "freshness" meets downstream timing constraints.

First and second subsystem function controllers 116 and 118 retrieve a common set of data $D_{CS}$ (e.g., output data stream $D_{OS2}$) from the shared data buffer 112 to carry out respective features $F_{11-PDS}$ and $F_{21-LDS}$ of the PD and LD subsystems, respectively. Each subsystem function $F_{11-PDS}$ and $F_{21-LDS}$ may carry out a respective set of computations $C_{S1}$ to $C_{S2}$ that are wholly or partially dependent on the common data set $D_{CS}$ pulled from the shared data buffer 112. A feature within each function $F_{11-PDS}$ to $F_{21-LDS}$ may contain a respective sequence of computations, with some of the existing computations shared by multiple features (e.g., math library functions, signal processing, etc.). A master control unit 120 running a computation synchronization (sync) protocol receives these computation sets $C_{S1}$ to $C_{S2}$, which are sorted into a computation request queue stored in physical cache memory of a resident or remote memory device, such as electronic memory devices 38 of FIG. 1. Shared computation is governed by the sync protocol, which may allow the shared computation module 114 to execute a single computation at a given time. Data generated by common computations in different features (e.g., RGB-to-grey image preprocessing, convolutional neural network (CNN) post-processing, etc.) are shared to reduce the HW and SF costs of repeating computations. Third and fourth subsystem function controllers 122 and 124 retrieve a common set of computations Ccs (e.g., output data stream $D_{OS2}$) for respective features $F_{13-PDS}$ to $F_{23-LDS}$, and transmit command signals to a brake system control module (BCM) 126 and a steering control module (SCM) 128 to execute one or more automated control operations.

A non-limiting example of computation sharing includes edge detection for feature identification of target objects using histogram of oriented gradients (HOG). Edge detection is an image processing technique for finding the outlines or boundaries of objects in digital images. Most edge detection techniques work by detecting discontinuities in brightness, and are used for image segmentation and data extraction during image processing in computer-based vision. An HOG is a feature descriptor used in digital image processing for object detection by converting an image or image patch to a feature vector/array. The HOG technique derives the distribution (histograms) of gradient directions (oriented gradients) in localized portions of an image to identify regions of abrupt intensity changes that correspond to object edges and corners. This method is typically computed on a dense grid of uniformly spaced cells, and uses overlapping local contrast normalization for improved accuracy. The applications of both pedestrian detection and lane detection use HOG edge detection to identify features of interest. Rather than provoking multiple embedded controllers to effectuate HOG computation of a similar digital image, a single controller is employed to compute features for pedestrian detection and lane detection.

Data sharing through the shared data buffer 112 may be provisioned by assigning to each data stream a timestamp and an attribute of "freshness," such as a pre-defined data lifespan. The timestamp may be indicative of a time and date when the data is taken (e.g., 2019-10-23 W 13:20:032 EST), whereas the freshness attribute may be indicative of a duration during which the data is valid (e.g., 3 sec). For at least some implementations, data may be generated via multiple computations (Comp_1, . . . , Comp_n) carried out by multiple embedded controllers, and via multiple sensing devices running at (combinable) harmonic rates or (uncombinable) nonharmonic rates. It may be assumed that an event trigger is inadequate for purposes of data sharing; in such instances, data sharing may be driven by signal frequency. For example, data sharing for harmonic sensor sampling rates may be premised on the restriction that all considered data streams satisfy P_i=k_i*min(P_1, . . . , P+n). By way of non-limiting example, an embedded processing system may receive three data streams with respective sampling periods P_1, P_2 and P_3, where P_1<P_2<P_3. These sampling periods may be characterized as "harmonic" when one period is an integral multiple of another period. For instance, P_3 is five times longer than P_1 and P_2 is two times longer than P_1, such that: P_1=k_1*min(P_1, P_2, P_3), k_1=1 (P_1=P_1); P_2=k_2*min(P_1, P_2, P_3), k_2=2 (P_2=2×P_1); P_3=k_3*min(P_1, P_2, P_3), k_3=5 (P_3=5×P_1). At a given first time sample, e.g., t=1, if S1_1=S3_1, but S2_1≠S1_1, the buffer may: (1) randomly store S1_1 or S2_1 or S3_1; (2) store S1_1 through fault tolerance; or (3) apply respective weights to S1_1, S2_1 and S3_1, then store the average: $S_{Avg}$=w_1*S1_1+w_2*S2_1+w_3*S3_1.

Disclosed embedded processing techniques also enable data sharing through a shared data buffer 112 for nonharmonic sensor sampling rates. A set of sampling periods may be designated as "nonharmonic" when one period is a fraction multiple of another period. In this instance, a data freshness attribute, namely data lifespan D_i of a fixed time duration, is defined for each input data stream $Stm_i$. To reduce computation workload and duplicative storage, each data set is evaluated to determine if the maximum delay for the next sample is sooner than the data lifespan D_i assigned to that data set: if so, the current data set is used and stored; if not, the current data set is purged or otherwise "skipped." For example, a resident controller calculates a data elapse time $t_{DEi}$ for each data stream as:

$$t_{DEi} = \left((m+1)Pi - \left\lfloor \frac{mPi}{Pj} \right\rfloor Pj\right)$$

where m is an integer-type constant; Pi is an invocation period for the subject data stream; and Pj is an invocation period for a comparison data stream. An invocation period may be typified as is a time delay between two consecutive invocations of the same computation. If a first data elapse time $t_{DE1}$ calculated for a first data stream is less than the data lifespan D_1 for that data stream, the data buffer responsively skips the current (first) data input stream and, optionally, purges this data stream.

Figure 3:
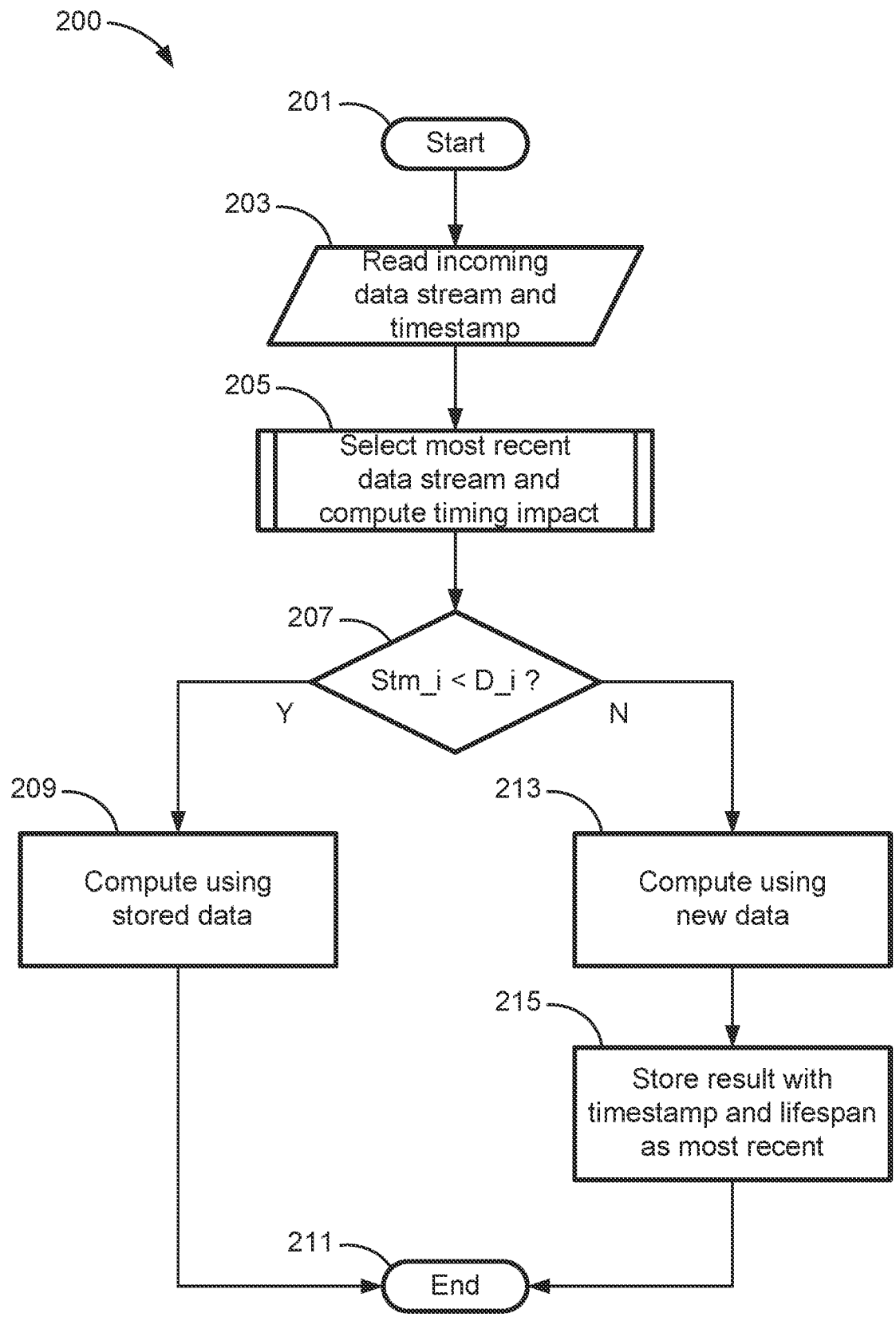
FIG. 3 is a flowchart illustrating a representative data sharing protocol for an embedded processing system, which may correspond to memory-stored instructions executed by an onboard or remote controller, control-logic circuitry, programmable electronic control unit, or other integrated circuit (IC) device or a network of IC devices in accord with aspects of the disclosed concepts.
Figure 4:
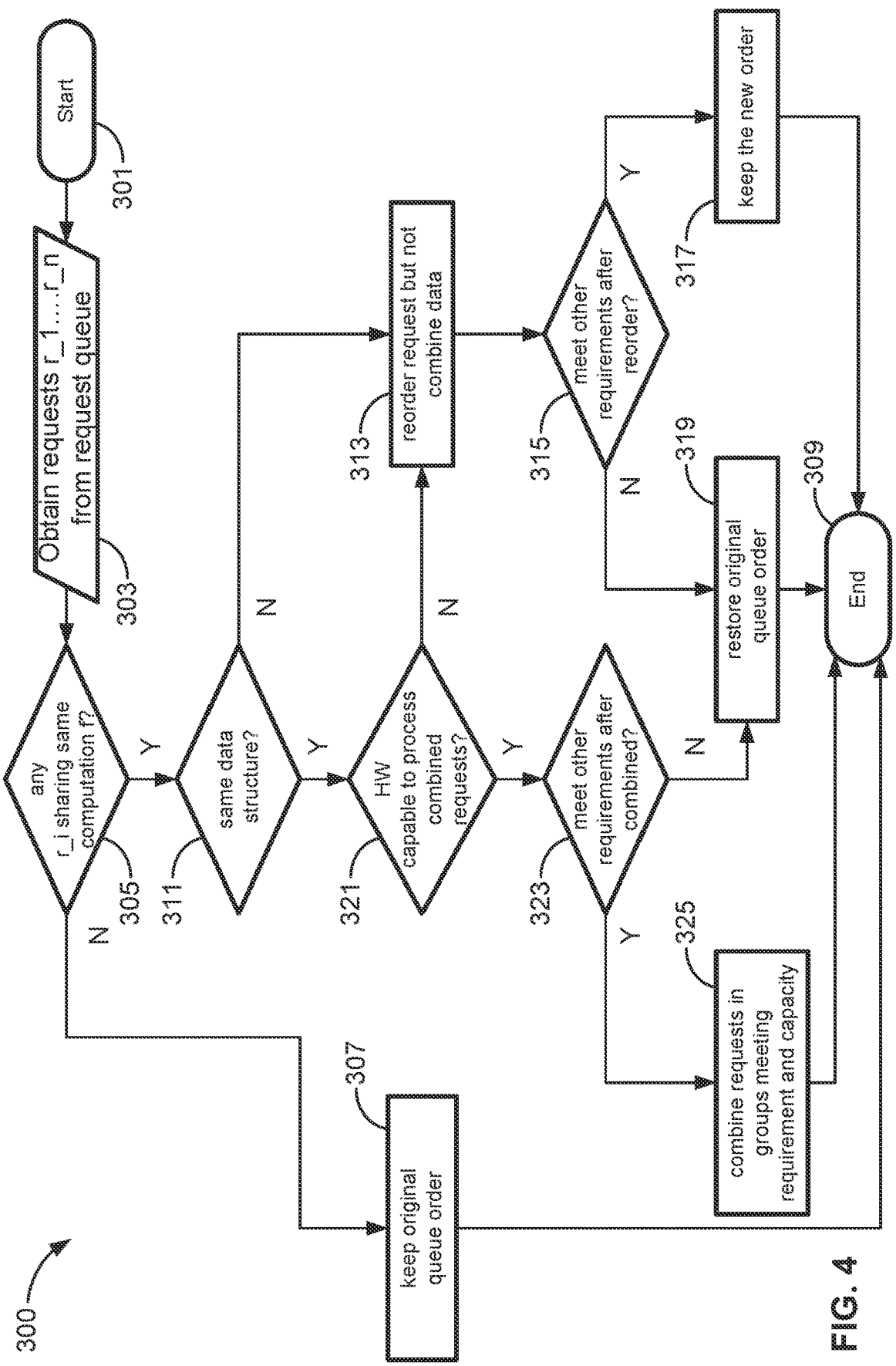
FIG. 4 is a flowchart illustrating a representative computation sharing protocol for an embedded processing system, which may correspond to memory-stored instructions executed by an onboard or remote controller, control-logic circuitry, programmable electronic control unit, or other integrated circuit (IC) device or a network of IC devices in accord with aspects of the disclosed concepts.

With reference next to the flow chart of FIG. 3, an improved data sharing protocol for an embedded processing system, such as embedded control system 100 of FIG. 2, which may be implemented by a fully or partially autonomous vehicle, such as motor vehicle 10 of FIG. 1, is generally described at 200 in accordance with aspects of the present disclosure. In the same vein, FIG. 4 presents at 300 an improved computation sharing protocol for an embedded processing system in accordance with aspects of the present disclosure. Some or all of the operations illustrated in FIGS. 3 and 4 and described in further detail below may be representative of an algorithm that corresponds to processor-executable instructions that may be stored, for example, in main or auxiliary or remote memory, and executed, for example, by an on-board or off-board controller, processing unit, control logic circuit, or other module or device or network of modules/devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 200 begins at terminal block 201 of FIG. 3 with processor-executable instructions for a programmable controller or control module or similarly suitable processor to call up an initialization procedure for a high-performance embedded data processing protocol. This routine may be executed in real-time, continuously, systematically, sporadically, and/or at regular intervals, for example, each 100 milliseconds, during active or autonomous vehicle operation. As yet another option, block 201 may initialize responsive to a user prompt from an occupant of a vehicle or a broadcast prompt signal from a backend or middleware computing node tasked with collecting, analyzing, sorting, storing and distributing vehicle commands and data. To carry out this protocol, a vehicle control system or any combination of one or more subsystems may be operable to receive, process, and synthesize pertinent information and inputs, and execute control logic and algorithms to regulate various vehicle systems, such as the powertrain system, fuel system, battery system, steering system, etc., to achieve desired control targets.

At input/output block 203, the method 200 reads an incoming data input stream stm_i and the associated timestamp and lifespan for that stream. Prior to receiving a "new" or second-in-time data input stream at block 203, one of the embedded controllers may have already received a "prior" or first-in-time data input stream stm_j from one or more sensors in a distributed array of sensors, e.g., at terminal block 201. This existing (first) data input stream stm_j is temporarily stored via a shared data buffer in a resident memory device with a corresponding timestamp and data lifespan. One of the embedded controllers may receive the new (second) data input stream stm_i from one or more of the distributed sensors; the embedded processing system then checks the reusability of the stored (first) data stream. For instance, if a current time is less than a mathematical sum of the data stream's timestamp and lifespan, that data can be reused; there is no need to recollect or recompute and store the same data.

Method 200 of FIG. 3 proceeds from input/output block 203 to predefined process block 205, which provides processor-executable instructions to select the most recent data stream stm_j that is stored in memory via shared data buffer, and compute a timing impact for the incoming data stream stm_i. As indicated above, a data elapse time $t_{DEi}$ may be calculated for any received data stream. The embedded processing system thereafter ascertains whether or not the timing impact of the incoming stream violates a downstream timing constraint. Moving to decision block 207, for example, the method 200 determines if a data elapse time $t_{DE2}$ for the incoming (second) data stream is less than the data lifespan D_2. If the data elapse time $t_{DE2}$ calculated for the second data stream is less than the data lifespan D_2 for that data stream, the timing impact violates the downstream timing constraint (block 207=YES) and is skipped. The method 200 responsively proceeds to process block 209, purges the new data stream, and uses the stored data stream for subsequent use by a subsystem function for feature-related computations. Once these measures are completed, the method 200 of FIG. 3 may advance from process block 209 to terminal block 211 and terminate, or may loop back to terminal block 201 and run in a continuous loop.

If the data elapse time $t_{DE2}$ calculated for the second data stream is greater than the data lifespan D_2, the timing impact does not violate the downstream timing constraint (block 207=NO). In such an instance, the method 200 responsively advances from decision block 207 to process block 213, purges the existing data stream from memory, and uses the new data stream for subsequent use by a subsystem function for feature-related computations. For instance, future computations are computed using the incoming data stream, at process block 213, and the results are stored in memory as "most recent" with a corresponding timestamp and lifespan, at process block 215. Method 200 of FIG. 3 then advances from process block 215 to terminal block 211 and either terminates or loops back to terminal block 201.

Computation sharing method 300 of FIG. 4 may be implemented for computations that share a common data type, but may be unsuitable for combining computations with different data types. In order to demarcate between implementations using the same type of data and those using distinct types of data, a merge manager (MM) module may be implemented to ascertain whether or not the data can be merged. In at least some implementations, computations can be merged if the data shares the same structure and same size/dimension. For example, a matrix multiplication of two 3×3 floating-point data matrices may be merged, whereas a matrix multiplication of a 3×3 floating-point data matrix and a 2×5 floating-point data matrix likely may not be merged. Along the same lines, a floating-point multiplication and an integer multiplication cannot be merged.

For computations sharing a common data type, the MM module may combine the two computation requests into one request, and send the computation request to one embedded device for execution, e.g., when pre-defined constraints (e.g., timing, performance, HW capacity, etc.) are met. As an example, a scheduling module operating within the embedded system (e.g., operating system or device driver) may receive several computation requests from various embedded devices to carry out a matrix multiplication MMUL operation. Each computation request may be accompanied by a memory location of the corresponding data. The scheduling system evaluates the several requests in an attempt to combine them into a single computation in order to reduce overhead (e.g., for transfer data and code) and delay (e.g., high parallelism).

Antithetical to computations sharing a common data type, the resultant data for computations with different sizes or structures, and thus, dissimilar data types likely cannot be merged. Recognizing that all data has a specified size, the system may first check to confirm that the available memory on an embedded device carrying out the associated computation is larger than the data and, thus, the data will "fit" on that device. For computations with different data types, the MM module may reorder a queued set of computation requests to minimize exchange code in and out, e.g., when a predetermined set of constraints (e.g., timing, performance, HW capacity, etc.) are met. Multiple computation requests may come from a single application or different applications; the requests may include two matrix multiplication requests MMUL1 and MMUL2 and one vector addition request VADD1. Based on a default first-in-first-out (FIFO) model, the requests may be initially arranged in an order of: . . . , MMUL1, VADD1, MMUL2, . . . . In order to streamline compatible computations, MM module reorders the requests to align MMUL1 and MMUL2 such that MMUL can be executed together: . . . , MMUL1, MMUL2, VADD . . . . If MMUL1 and MMUL2 both use the same computation MMUL with different data, aligning the computations allows the system to load MMUL code to an embedded device (e.g., CPU, GPU, etc.) once, run MMUL1 and MMUL2 back-to-back, and then switch out the MMUL code to VADD code in order to run VADD1.

Method 300 begins at terminal block 301 of FIG. 4 with processor-executable instructions for a programmable controller or control module or similarly suitable processor to call up an initialization procedure for a high-performance embedded data processing protocol. For applications in which the method 200 of FIG. 3 is combined with the method 300 of FIG. 4, terminal blocks 201 and 301 may be combined or terminal blocks 211 and 301 may be combined, as some non-limiting examples. In this regard, the features and options associated with terminal block 301 described above may be incorporated, singly or in any suitable combination, into terminal block 301.

Method 300 of FIG. 4 advances from terminal block 301 to input/output block 303, which provides memory-stored, processor-executable instructions to obtain a plurality of computation requests $r_1 \ldots r_n$ from a computation request queue stored in a system memory device. During operation of the embedded control system 100 of FIG. 2, for example, master control unit 120 may receive multiple computation requests from multiple embedded controllers 108, 110 to process data generated via the distributed array of sensors 102, 104. Master control unit 120 systematically arranges the received computation requests within the computation request queue in accordance with any logically applicable scheduling protocol. Input/output block 303 may selectively callup the computation request queue in order to evaluate the computation requests currently sorted therein.

From input/output block 303, the method 300 moves to decision block 305 to ascertain whether or not any of the scheduled computation requests within the computation request queue share a common computational procedure, as described above. If not (block 305=NO), method 300 moves to process block 307 and responsively maintains the current sequence of computation requests within the computation request queue. An optional flag may be set to indicate that computation requests $r_1 \ldots r_n$ presently sorted in the queue do not have overlapping computations. Once these measures are completed, the method 300 of FIG. 4 may advance from process block 307 to terminal block 309 and terminate, or may loop back to terminal block 301 and run in a continuous loop.

Upon determining that at least two of the scheduled computation requests within the computation request queue share a common computational procedure (block 305=YES), method 300 proceeds to decision block 311 to ascertain if the data output of the shared computation associated with the requests share a common data structure. Method 300 may automatically respond to the data output of the overlapping computation requests not sharing a common data structure (block 311=NO) by rearranging the current sequence of computation requests in the computation request queue into a reordered sequence, as indicated at process block 313. Advancing to decision block 315, it is determined whether or not the overlapping computation requests satisfy a predefined set of utilization and timing requirements. If so (block 315=YES), the rearranged sequence of computation requests in the computation request queue is approved and temporarily stored, at process block 317. If the overlapping computation requests do not satisfy the utilization and timing requirements (block 315=No), the rearranged sequence of computation requests in the computation request queue is denied, the original/previous order restored, and the restored queue temporarily stored, at process block 319. In either instance, the method 300 thereafter moves from process blocks 317 and 319 to terminal block 309.

After determining that the data output of the two or more overlapping computation requests share a common data structure (block 311=YES), method 300 of FIG. 4 responsively determines if is the embedded HW is capable of processing the combined requests, as indicated at decision block 321. For example, master control unit 120 may prompt one or both ECUs 108, 110 to each confirm that their respective hardware capacity is sufficient to complete the common computational procedure. This may involve various evaluations for the different embedded devices. For instance, the master control unit 120 may check the size of available memory on each of ECU 108 and 110 to confirm it is sufficient to accommodate the size of the data. For a GPU, the system may first confirm that there is a sufficient number of computing cores to carry out the requested operation. As per an FPGA, the system may first check to confirm that there is a sufficient number of input channels for the feeding data and operations. Responsive to the hardware capacity not being sufficient to complete the combined request (block 321=NO), the method 300 continues to process block 313 and any corresponding operations subsequent thereto, as described above.

If the embedded HW is capable of processing the combined requests (block 321=YES), the method 300 determines whether or not the combined requests meet other preprogrammed requirements, as indicated at decision block 323. The "other requirements" illustrated in decision block 323 of FIG. 4 may coincide, in whole or in part, with the "other requirements" set forth in decision block 315, albeit performed after different operations. Typical other requirements may cover utilization requirements and timing requirements. Utilization, which may be computed as a sum of all requests' computation times divided by an associated time period, should be smaller than a threshold value specified at design time. Timing requirements may include a maximum delay, including all delays caused by contention and interference, to complete a request computation; the calculated delay should be less than a given value or "deadline." Other requirements and constraints may also be defined (e.g., a threshold operating temperature, a threshold power consumption, etc). If the other requirements are not met (block 321=NO), the original queue order is restored at process block 319, and the method thereafter terminates at terminal block 309 or loops back to terminal block 301. On the other hand, if the other predefined requirements are met (block 321=YES), the method 300 responsively combines the overlapping computational requests into a single request, at block 325, updates the request queue accordingly, and proceeds to either terminal block 301 or 309.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a networked set of embedded controllers operatively connected with a distributed array of sensors, the method comprising:
   receiving a first data input stream from a set of the sensors via a first of the embedded controllers;
   storing, via a shared data buffer in a resident memory device, the first data input stream with a first timestamp and a first data lifespan;
   receiving a second data input stream from the set of sensors via a second of the embedded controllers;
   determining a timing impact of the stored first data input stream based on the received second data input stream, wherein determining the timing impact includes calculating a first data elapse time $t_{DE1}$ for the first data input stream as:

$$t_{DE1} = \left((m+1)P1 - \left\lfloor \frac{mP1}{P2} \right\rfloor P2\right)$$

where m is an integer-type constant, P1 is a first invocation period for the first data input stream, and P2 is a second invocation period for the second data input stream;
   determining if the timing impact violates a predefined timing constraint; and
   responsive to the timing impact violating the predefined timing constraint, purging the first data input stream from the resident memory device and storing the second data input stream with a second timestamp and a second data lifespan in the resident memory device.

2. The method of claim 1, wherein the timing impact of the stored first data input stream violates the predefined timing constraint when the first data lifespan is greater than the first data elapse time $t_{DE1}$.

3. The method of claim 2, further comprising purging the second data input stream responsive to the timing impact not violating the predefined timing constraint.

4. The method of claim 1, further comprising:
   receiving multiple computation requests to process data generated via the distributed array of sensors; and
   arranging the received computation requests within a computation request queue stored in the resident memory device.

5. The method of claim 4, further comprising:
   determining if at least two of the computation requests arranged in the computation request queue share a common computational procedure; and
   responsive to a determination that none of the computation requests share the common computational procedure, maintaining a current sequence of the computation requests arranged in the computation request queue.

6. The method of claim 5, further comprising:
   responsive to the at least two of the computation requests sharing the common computational procedure, determining if a data output of the at least two of the computation requests share a common data structure; and
   responsive to the data output of the at least two of the computation requests not sharing the common data structure, rearranging the current sequence of the computation requests arranged in the computation request queue into a rearranged sequence.

7. The method of claim 6, further comprising:
responsive to the data output of the at least two of the computation requests sharing the common data structure, determining if a hardware capacity of the first or second of the embedded controllers is sufficient to complete the common computational procedure; and
responsive to the hardware capacity not being sufficient to complete the common computational procedure, rearranging the current sequence of the computation requests arranged in the computation request queue into the rearranged sequence.

8. The method of claim 7, further comprising:
responsive to the data output of the at least two of the computation requests not sharing the common data structure and the hardware capacity not being sufficient to complete the common computational procedure, determining if the at least two of the computation requests satisfy a predefined set of utilization and timing requirements; and
responsive to the at least two of the computation requests not satisfying the predefined set of utilization and timing requirements, restoring the rearranged sequence of the computation requests arranged in the computation request queue to the current sequence.

9. The method of claim 8, further comprising, responsive to the at least two of the computation requests satisfying the predefined set of utilization and timing requirements, storing the rearranged sequence of the computation requests arranged in the computation request queue in the resident memory device.

10. The method of claim 8, further comprising determining, responsive to the hardware capacity of the first of the embedded controllers being sufficient to complete the common computational procedure, if the at least two of the computation requests satisfy a predefined set of utilization and timing requirements, wherein the combining the at least two of the computation requests and the updating the computation request queue are further in response to the at least two of the computation requests satisfying the predefined set of utilization and timing requirements.

11. The method of claim 10, further comprising restoring, responsive to the at least two of the computation requests not satisfying the predefined set of utilization and timing requirements, the rearranged sequence of the computation requests arranged in the computation request queue to the current sequence.

12. The method of claim 7, further comprising, responsive to the hardware capacity of the first of the embedded controllers being sufficient to complete the common computational procedure:
combining the at least two of the computation requests into a single group request; and
updating the computation request queue to replace the at least two of the computation requests with the single group request.

13. The method of claim 1, further comprising transmitting a command signal to a steering control module (SCM), a brake system control module (BCM), and/or a powertrain control module of a motor vehicle to execute a control operation based on the second data input stream stored in the resident memory device.

14. A method of operating a networked set of embedded controllers operatively connected with a distributed array of sensors, the method comprising:
receiving a first data input stream from a set of the sensors via a first of the embedded controllers;
storing, via a shared data buffer in a resident memory device, the first data input stream with a first timestamp and a first data lifespan;
receiving a second data input stream from the set of sensors via a second of the embedded controllers;
determining a timing impact of the stored first data input stream based on the received second data input stream;
determining if the timing impact violates a predefined timing constraint;
responsive to the timing impact violating the predefined timing constraint, purging the first data input stream from the resident memory device and storing the second data input stream with a second timestamp and a second data lifespan in the resident memory device;
receiving multiple computation requests to process data generated via the distributed array of sensors;
arranging the received computation requests within a computation request queue stored in the resident memory device;
determining if at least two of the computation requests arranged in the computation request queue share a common computational procedure;
responsive to the at least two of the computation requests sharing the common computational procedure, determining if a data output of the at least two of the computation requests share a common data structure; and
responsive to the data output of the at least two of the computation requests not sharing the common data structure, rearranging the current sequence of the computation requests arranged in the computation request queue into a rearranged sequence.

15. A method of operating a networked set of embedded controllers operatively connected with a distributed array of sensors, the method comprising:
receiving a first data input stream from a set of the sensors via a first of the embedded controllers;
storing, via a shared data buffer in a resident memory device, the first data input stream with a first timestamp and a first data lifespan;
receiving a second data input stream from the set of sensors via a second of the embedded controllers;
determining a timing impact of the stored first data input stream based on the received second data input stream;
determining if the timing impact violates a predefined timing constraint;
responsive to the timing impact violating the predefined timing constraint, purging the first data input stream from the resident memory device and storing the second data input stream with a second timestamp and a second data lifespan in the resident memory device; and
transmitting a command signal to a steering control module (SCM), a brake system control module (BCM), and/or a powertrain control module of a motor vehicle to execute a control operation based on the second data input stream stored in the resident memory device.

16. The method of claim 15, further comprising:
receiving multiple computation requests to process data generated via the distributed array of sensors; and
arranging the received computation requests within a computation request queue stored in the resident memory device.

17. The method of claim 16, further comprising:
determining if at least two of the computation requests arranged in the computation request queue share a common computational procedure; and
responsive to a determination that none of the computation requests share the common computational procedure, maintaining a current sequence of the computation requests arranged in the computation request queue.

18. The method of claim 17, further comprising:
responsive to the at least two of the computation requests sharing the common computational procedure, determining if a data output of the at least two of the computation requests share a common data structure; and
responsive to the data output of the at least two of the computation requests not sharing the common data structure, rearranging the current sequence of the computation requests arranged in the computation request queue into a rearranged sequence.

19. The method of claim 18, further comprising:
responsive to the data output of the at least two of the computation requests sharing the common data structure, determining if a hardware capacity of the first or second of the embedded controllers is sufficient to complete the common computational procedure; and
responsive to the hardware capacity not being sufficient to complete the common computational procedure, rearranging the current sequence of the computation requests arranged in the computation request queue into the rearranged sequence.

20. The method of claim 19, further comprising:
responsive to the data output of the at least two of the computation requests not sharing the common data structure and the hardware capacity not being sufficient to complete the common computational procedure, determining if the at least two of the computation requests satisfy a predefined set of utilization and timing requirements; and
responsive to the at least two of the computation requests not satisfying the predefined set of utilization and timing requirements, restoring the rearranged sequence of the computation requests arranged in the computation request queue to the current sequence.

\* \* \* \* \*